US012798270B2

(12) United States Patent
Takezawa et al.

(10) Patent No.: US 12,798,270 B2
(45) Date of Patent: Nov. 17, 2026

(54) SHEET CONVEYING DEVICE AND IMAGE FORMING APPARATUS INCLUDING SHEET HOLDING MECHANISM CAPABLE OF HOLDING SHEET AGAINST MOVEMENT AWAY FROM SHEET ALIGNMENT PLATE

(71) Applicant: KYOCERA Document Solutions Inc., Osaka (JP)

(72) Inventors: Mashio Takezawa, Osaka (JP); Shuji Osaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/239,388

(22) Filed: Jun. 16, 2025

(65) Prior Publication Data

US 2026/0008283 A1 Jan. 8, 2026

(30) Foreign Application Priority Data

Jul. 2, 2024 (JP) ................................ 2024-106781

(51) Int. Cl.

*B41J 13/32* (2006.01)
*B41J 13/03* (2006.01)
*B41J 13/076* (2006.01)

(52) U.S. Cl.

CPC ............... *B41J 13/32* (2013.01); *B41J 13/03* (2013.01); *B41J 13/076* (2013.01)

(58) Field of Classification Search

CPC .............................................. B65H 3301/4421
See application file for complete search history.

(56) References Cited

U.S. PATENT DOCUMENTS 3,916,741 A * 11/1975 Comstock ................ B26D 7/18 83/34
9,315,053 B2 * 4/2016 Hamakawa ............ B41J 13/025
2012/0302415 A1 11/2012 Yamamoto et al.

FOREIGN PATENT DOCUMENTS

WO 2011086700 A 7/2011

* cited by examiner

*Primary Examiner* — Howard J Sanders
(74) *Attorney, Agent, or Firm* — IP Business Solutions, LLC.

(57) ABSTRACT

A sheet conveying device includes a sheet conveyance path, a conveyance roller, an alignment plate, an alignment roller, and a sheet holding mechanism. The conveyance roller conveys a sheet along the sheet conveyance path. The alignment plate is provided at one end of the sheet conveyance path in a direction orthogonal to a direction of conveyance of the sheet and in parallel with the direction of conveyance of the sheet and aligns a position of the sheet in the direction orthogonal to the direction of conveyance. The alignment roller rotates in the direction orthogonal to the direction of conveyance while making contact with the sheet present in the sheet conveyance path, thus bringing the sheet into abutment on the alignment plate. The sheet holding mechanism makes contact from above with the sheet present in the sheet conveyance path to hold the sheet against movement away from the alignment plate.

4 Claims, 10 Drawing Sheets

SHEET CONVEYING DEVICE AND IMAGE FORMING APPARATUS INCLUDING SHEET HOLDING MECHANISM CAPABLE OF HOLDING SHEET AGAINST MOVEMENT AWAY FROM SHEET ALIGNMENT PLATE

INCORPORATION BY REFERENCE

This application claims priority to Japanese Patent Application No. 2024-106781 filed on 2 Jul. 2024, the entire contents of which are incorporated by reference herein.

BACKGROUND

The present disclosure relates to sheet conveying devices and image forming apparatuses and particularly relates to a technique for aligning the position of a sheet in a widthwise direction thereof.

There is known a technique in which, in a general sheet conveying device, an alignment roller brings a widthwise end of a sheet into abutment on an alignment plate disposed in parallel with the direction of conveyance of the sheet to align the position of the sheet in the widthwise direction. This technique has a problem of a sheet bounce that the sheet having abutted against the alignment plate causes due to impact from the alignment plate.

As a solution to this problem, for example, there is known a general technique for preventing a bounce of a sheet from a sheet stopper by controlling the rotation of a motor to slow down the sheet conveyance speed at a specified acceleration before the sheet abuts against the sheet stopper.

SUMMARY

A technique improved over the aforementioned techniques is proposed as one aspect of the present disclosure.

A sheet conveying device according to an aspect of the present disclosure includes a sheet conveyance path, a conveyance roller, an alignment plate, an alignment roller, and a sheet holding mechanism. The conveyance roller conveys a sheet along the sheet conveyance path. The alignment plate is provided at one end of the sheet conveyance path in a direction orthogonal to a direction of conveyance of the sheet and in parallel with the direction of conveyance of the sheet and aligns a position of the sheet in the direction orthogonal to the direction of conveyance. The alignment roller rotates in the direction orthogonal to the direction of conveyance while making contact with the sheet present in the sheet conveyance path, thus bringing the sheet into abutment on the alignment plate. The sheet holding mechanism makes contact from above with the sheet present in the sheet conveyance path to hold the sheet against movement away from the alignment plate.

An image forming apparatus according to another aspect of the present disclosure includes the above-described sheet conveying device and an image forming device. The image forming device forms an image on a sheet being conveyed by the conveyance roller.

DETAILED DESCRIPTION

Hereinafter, a description will be given of an image forming apparatus including a sheet conveying device according to an embodiment of the present disclosure with reference to the drawings.

[Structure and Configuration of Image Forming Apparatus 1]

Figure 1:
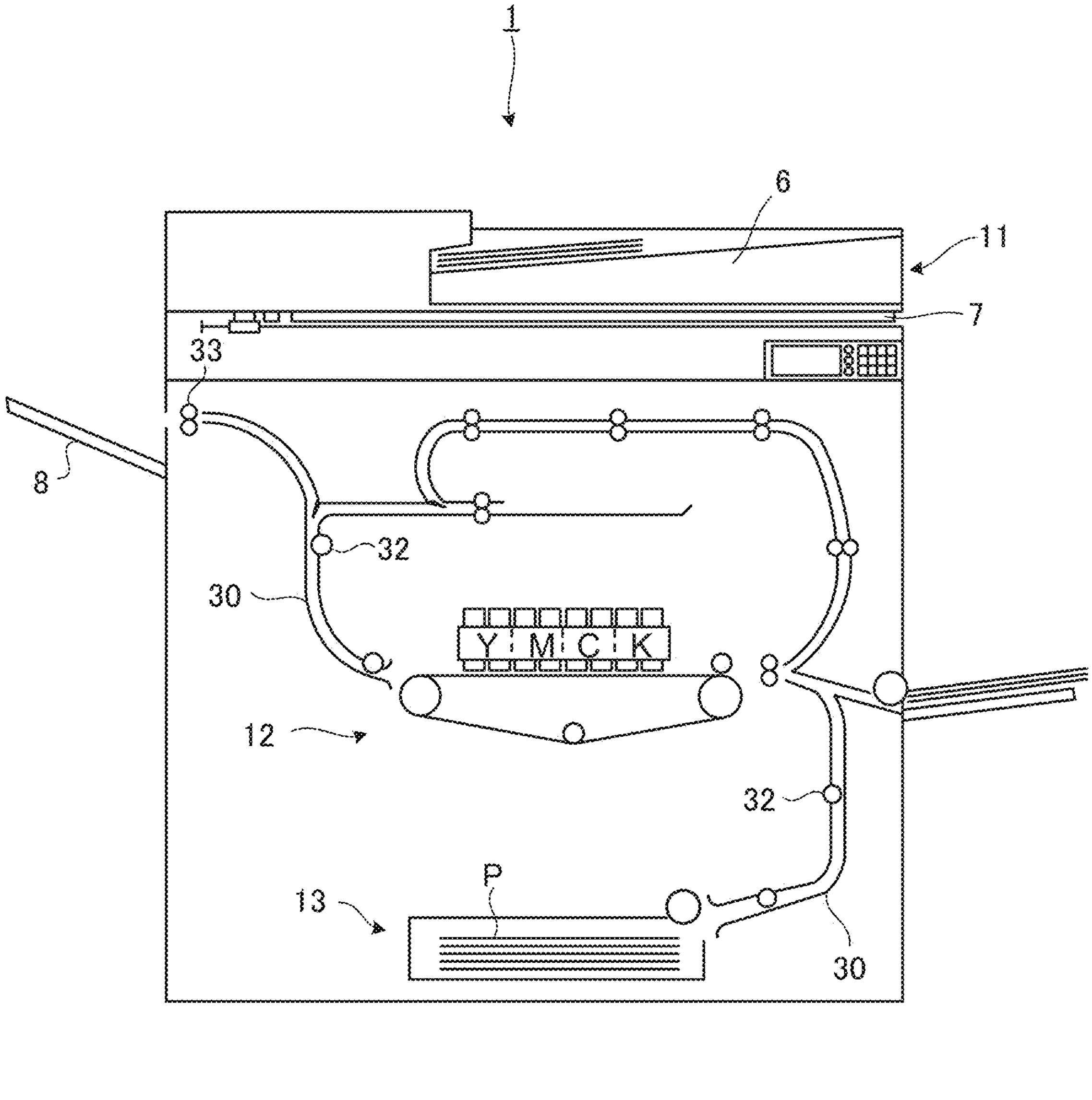
FIG. 1 is a frontal cross-sectional view showing the structure of an image forming apparatus.

FIG. 1 is a frontal cross-sectional view showing the structure of an image forming apparatus 1. Referring to FIG. 1, the image forming apparatus 1 is a multifunction peripheral having multiple functions, such as a copy function, a transmission function, a print function, and a facsimile function. The image forming apparatus 1 includes an image reading device 11, an image forming device 12, a sheet feed device 13, a sheet conveyance path 30, conveyance rollers 32, and an ejection roller 33.

The image reading device 11 reads an image of an original document while moving the original document or with the original document set in place, and generates image data from the read image. Specifically, the image reading device 11 is an ADF (auto document feeder) including: a document conveyance device 6 that conveys an original document placed on a document loading table; and a scanner that optically reads an original document conveyed by the document conveyance device 6 or an original document placed on a platen glass 7.

The image forming device 12 forms, in an ink-jet printing system, an image represented by image data on a sheet P being conveyed along the sheet conveyance path 30. The sheet feed device 13 pulls out a sheet P contained in a sheet feed cassette with a pick-up roller and feeds forward the pulled-out sheet to the sheet conveyance path 30. The type of sheet P for use is not limited to a paper sheet and may be, for example, an OHP (overhead projector) sheet.

The conveyance rollers 32 convey the sheet P along the sheet conveyance path 30. The ejection roller 33 ejects the sheet P with an image formed thereon to a sheet output tray 8. The conveyance rollers 32 and the ejection roller 33 are connected to a first drive motor included in a drive device 14 to be described hereinafter.

Figure 2:
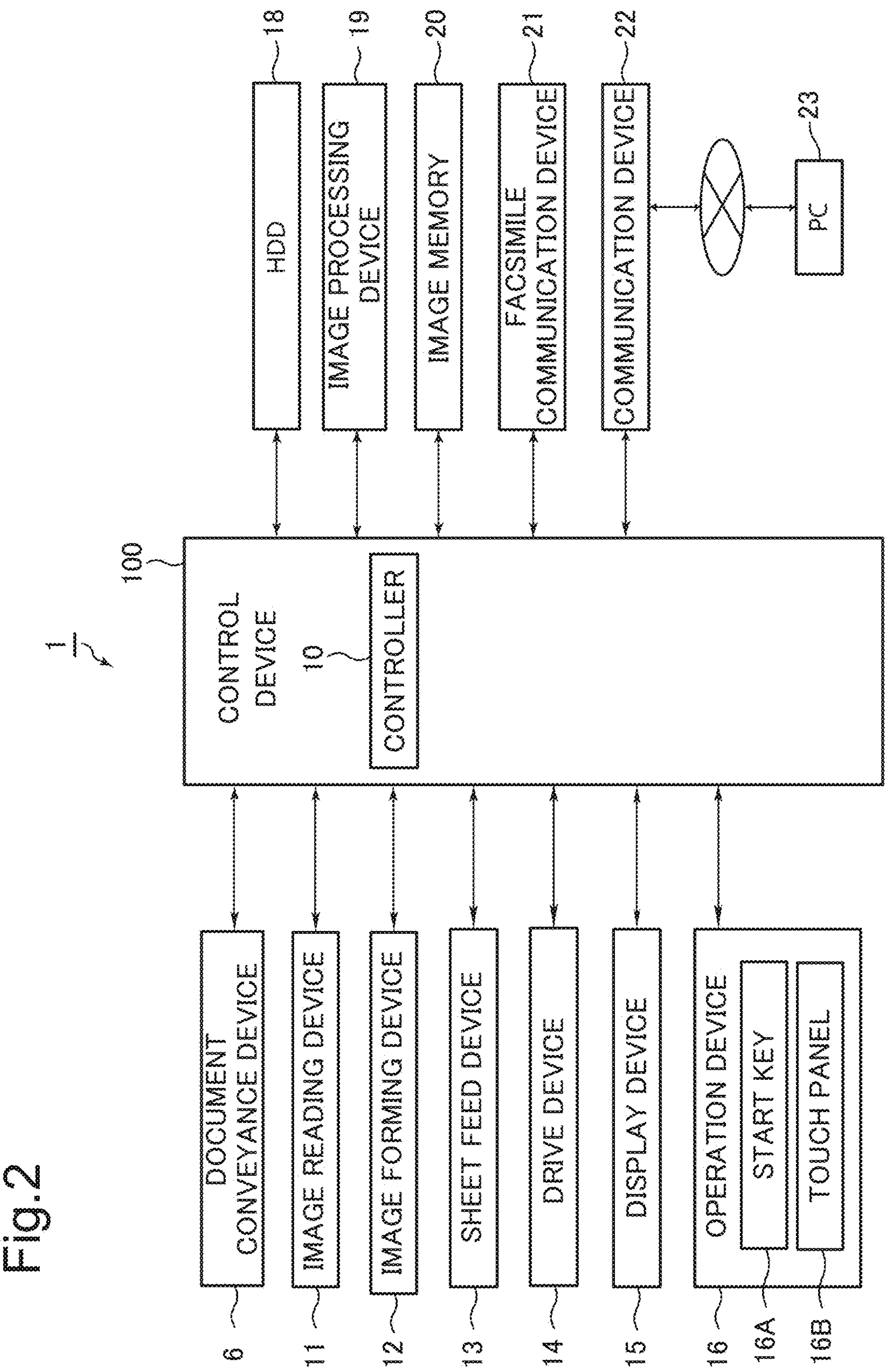
FIG. 2 is a block diagram showing the configuration of the image forming apparatus 1.

FIG. 2 is a block diagram showing the configuration of the image forming apparatus 1. Referring to FIG. 2, the image forming apparatus 1 includes a control device 100. The control device 100 includes a processor, a RAM (random access memory), and a ROM (read only memory). The processor is, for example, a CPU (central processing unit), an MPU (micro processing unit) or an ASIC (application specific integrated circuit).

When each of various types of computer programs stored in the ROM built in the control device 100 or an HDD (hard disk drive) 18 is executed by the above processor, the control device 100 functions as a controller 10. Alternatively, the controller 10 may not be implemented by the operation of the processor in accordance with the above computer programs, but may instead be configured operatively by a logic circuit, or may be configured implementably by two or more control devices.

The control device 100 is electrically connected to the document conveyance device 6, the image reading device 11, the image forming device 12, the sheet feed device 13, the drive device 14, a display device 15, an operation device 16, the HDD 18, an image processing device 19, an image memory 20, a facsimile communication device 21, a communication device 22, and so on.

The drive device 14 includes: a first drive motor that rotates the conveyance rollers 32 and the ejection roller 33; a second drive motor that rotates an alignment roller 50 to be described hereinafter; and a third drive motor that pivotally moves a sheet holding mechanism 60 to be described hereinafter.

The display device 15 is display device including a liquid crystal display or an organic EL (an organic light-emitting diode) display. The display device 15 displays various screens.

The operation device 16 includes a plurality of hard keys, including a start key 16A. The operation device 16 further includes a touch panel 16B superposed on the display device 15. The operation device 16 accepts an input of a user's instruction.

The HDD 18 stores image data generated by the image reading device 11, various computer programs for implementing the operations of the image forming apparatus 1, and so on. The HDD 18 stores, as one of the various computer programs, a control program for use in executing sheet alignment processing to be described hereinafter.

The image processing device 19 performs, as necessary, image processing of image data generated by the image reading device 11. The image memory 20 temporarily stores image data generated by the image reading device 11. The facsimile communication device 21 transfers image data to and from other facsimile devices via the public line.

The communication device 22 includes a communication module, such as a LAN (local area network) board. The controller 10 performs data communications through the communication device 22 with external devices, such as a PC (personal computer) 23, connected thereto via a network.

Each of the devices constituting the image forming apparatus 1 is connected to a power supply. When the image forming apparatus 1 is powered on by the user, electric power is supplied from the power supply to each of the devices of the image forming apparatus 1.

Hereinafter, a description will be given of the sheet conveyance path 30, the conveyance rollers 32, an alignment plate 40, an alignment roller 50, a sheet holding roller 70, and others all of which constitute the sheet conveying device 2 according to this embodiment with reference to FIGS. 3 to 6.

Figure 3:
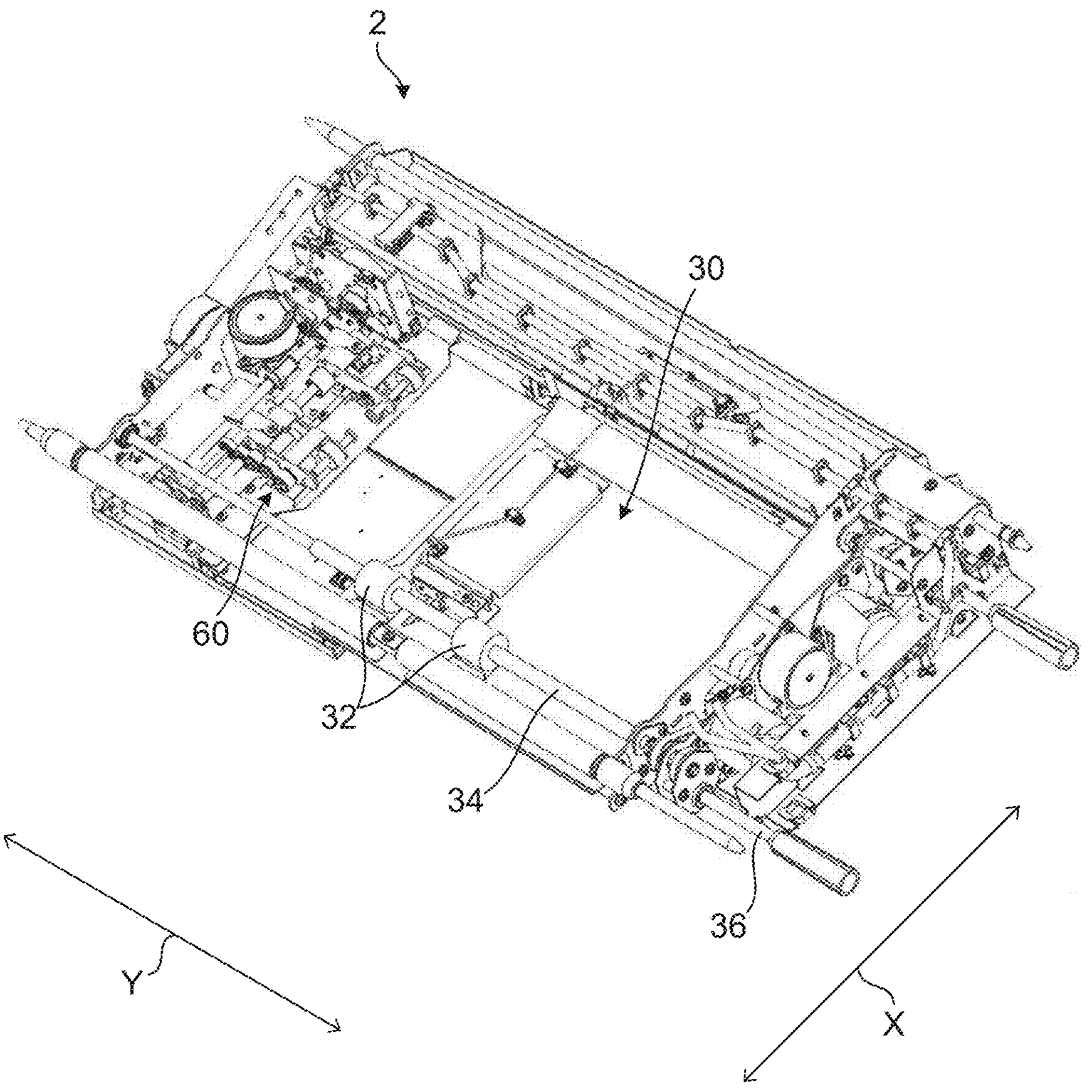
FIG. 3 is a perspective view showing a portion of a sheet conveyance path.

As shown in FIG. 3, the conveyance rollers 32 are provided in the sheet conveyance path 30. The conveyance rollers 32 are mounted on a lengthwise middle portion of a rotating shaft 34 extending in a direction (hereinafter, referred to as a "sheet width direction") Y orthogonal to a direction X of conveyance of a sheet. The rotating shaft 34 is connected via a train of gears meshed with each other to a drive shaft 36. The drive shaft 36 is connected to the first drive motor.

Figure 4:
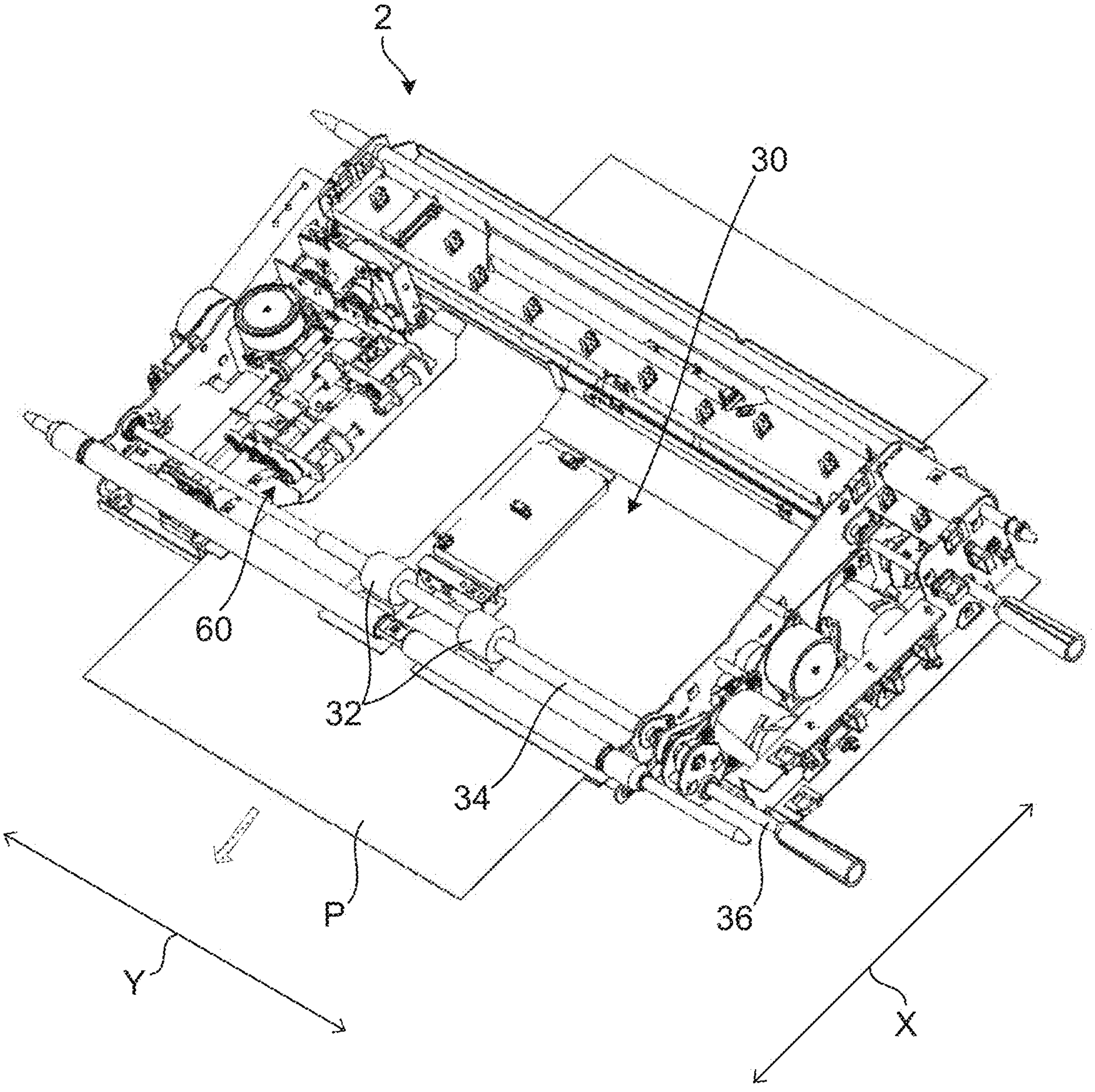
FIG. 4 is a perspective view showing how a sheet passes through the portion of the sheet conveyance path.

When the drive shaft 36 is rotated by the drive of the first drive motor, a drive force is transmitted via the train of gears to the rotating shaft 34 and the rotating shaft 34 thus rotates. When, with the rotation of the rotating shaft 34, the conveyance rollers 32 rotate clockwise as viewed in the plane of the figure while making contact with the top surface of the sheet P, the sheet P is conveyed along the sheet conveyance path 30 as shown in FIG. 4.

Figure 5:
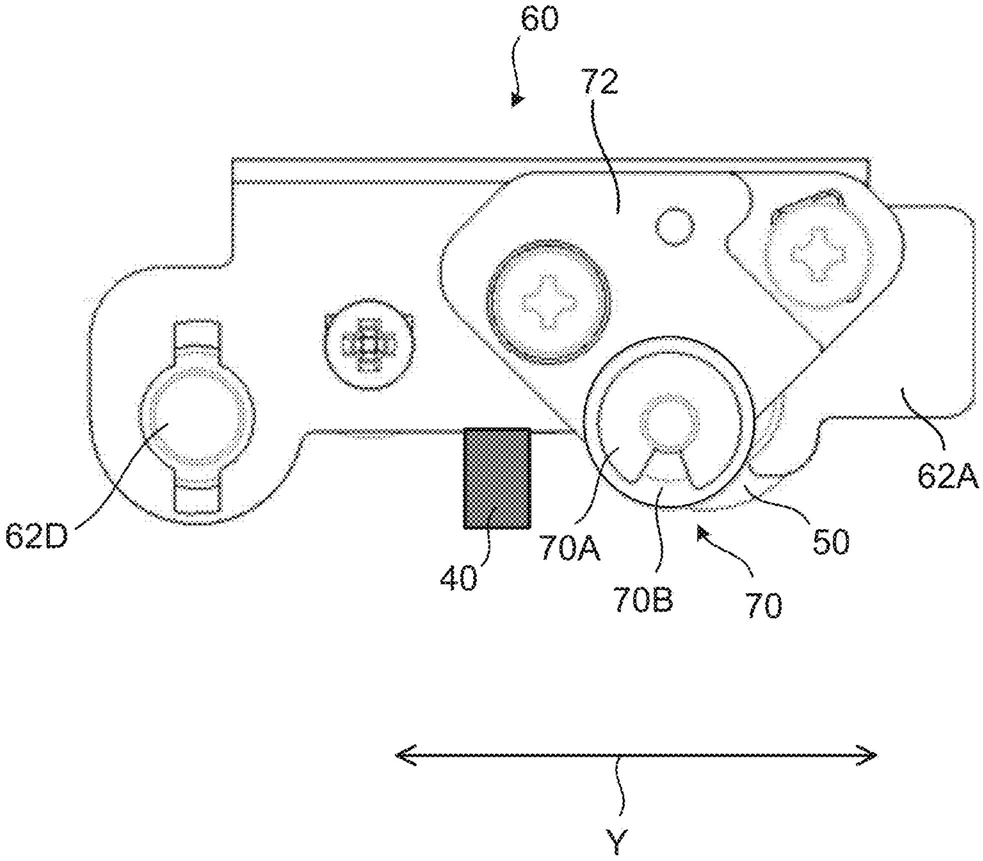
FIG. 5 is a side view showing a sheet holding mechanism.

A sheet holding mechanism 60 is provided at one end of the sheet conveyance path 30 in the sheet width direction Y and upstream of the conveyance rollers 32 in the direction X of conveyance. As shown in FIG. 5, an alignment plate 40 is provided below the sheet holding mechanism 60. The alignment plate 40 is disposed to make one side surface thereof facing the conveyance rollers 32 parallel to the direction X of conveyance. The alignment plate 40 aligns the position of the sheet P in the sheet width direction Y with the above one side surface.

Figure 6:
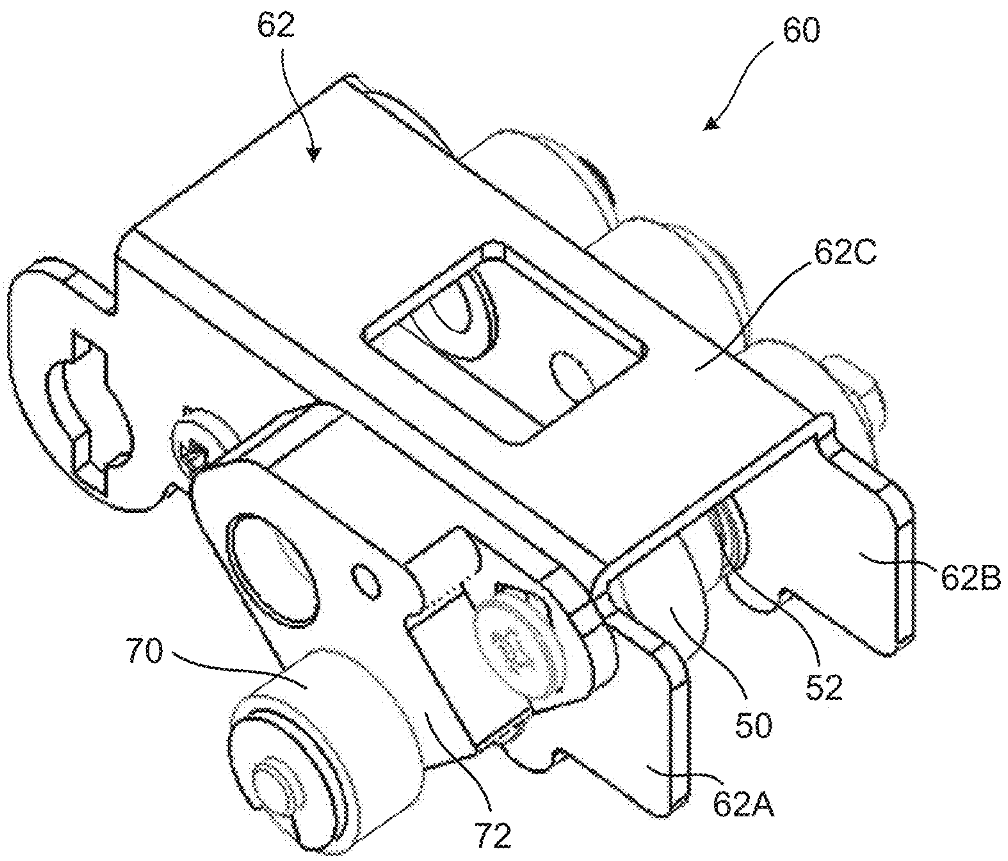
FIG. 6 is a perspective view showing the sheet holding mechanism.

As shown in FIG. 6, the sheet holding mechanism 60 includes a frame 62 including: a pair of side portions 62A, 62B opposed to each other; and a connecting portion 62C connecting between the side portions 62A, 62B, and thus having an approximately C-shaped cross section. In the space between the side portions 62A, 62B, an alignment roller 50 is provided to project partly beyond the opening of the approximately C-shaped cross section of the frame 62.

The alignment roller 50 is mounted on a rotating shaft 52 passing through the side portions 62A, 62B and is rotatable with the rotation of the rotating shaft 52. The rotating shaft 52 extends in the direction X of conveyance and is connected to the second drive motor. When the rotating shaft 52 is rotated by the drive of the second drive motor, the alignment roller 50 rotates. The alignment roller 50 rotates clockwise as viewed in the plane of the figure while making contact with the sheet P present in the sheet conveyance path 30, thus moving the sheet P in the sheet width direction Y and a direction toward the alignment plate 40 (hereinafter, referred to as a "sheet alignment direction Y1" (see FIG. 8B)) to bring the sheet P into abutment on the alignment plate 40.

A sheet holding roller 70 is mounted through a support 72 to the side portion 62A. The support 72 is fixed to the side portion 62A by screw fastening. The sheet holding roller 70 is mounted to the support 72 to project partly beyond the support 72 along a direction toward which the opening of the approximately C-shaped cross section of the frame 62 opens. In this manner, the sheet holding roller 70 is provided near the alignment roller 50.

The sheet holding roller 70 is composed of a cylindrical one-way clutch 70A and an elastic body 70B covering the periphery of the one-way clutch 70A. The one-way clutch 70A is rotatable only clockwise as viewed in the plane of FIG. 5 and not rotatable counterclockwise as viewed in the plane of FIG. 5. The material for the elastic body 70B is not particularly limited, but may be, for example, rubber or sponge.

In a state of contact with the sheet P present in the sheet conveyance path 30 from above, the sheet holding roller 70 rotates together with the movement of the sheet P in the sheet alignment direction Y1 (see FIG. 8B), but keeps from rotating in a direction of movement of the sheet P away from the alignment plate 40 (hereinafter, referred to as a "sheet bounce direction Y2" (see FIG. 8C)). In this manner, the sheet holding roller 70 makes contact from above with the sheet P present in the sheet conveyance path 30 to hold the sheet P against movement in the sheet bounce direction Y2.

One longitudinal end portions of the side portions 62A, 62B are supported by a rotating shaft 62D passing through the side portions 62A, 62B as shown in FIG. 5 and are pivotable with the rotation of the rotating shaft 62D. The rotating shaft 62D extends in the direction X of conveyance and is connected to the third drive motor. When the rotating shaft 62D is rotated by the drive of the third drive motor, the frame 62 pivotally moves with the rotating shaft 62D as the center.

By the pivotal movement of the frame 62, the sheet holding mechanism 60 takes either one of: a hold-down position where the alignment roller 50 and the sheet holding roller 70 make contact with the top surface of the sheet P present in the sheet conveyance path 30; and a backing position where the alignment roller 50 and the sheet holding roller 70 are out of contact with the top surface of the sheet P present in the sheet conveyance path 30.

A sheet detection sensor is provided in the sheet conveyance path 30 and near the sheet holding mechanism 60. The sheet detection sensor is a photosensor that detects the presence or absence of a sheet P being conveyed in the sheet conveyance path 30 and includes a light-emitting element and a light-receiving element opposed to each other to allow the sheet P to pass between them.

The sheet detection sensor outputs an OFF signal while detecting a sheet P, and outputs an ON signal while not detecting any sheet P. The type of the sheet detection sensor is not limited to the photosensor and may be, for example, a mechanical sensor having a structure capable of physically detecting contact with a sheet P.

[Operation]

Hereinafter, a description will be given of the operation of the image forming apparatus 1 during execution of sheet alignment processing with reference to FIGS. 7 to 8C and so on. In the following description, the controller 10 of the image forming apparatus 1 functions as part of the sheet conveying device 2.

Assume that the user places an original document on the platen glass 7 and presses the start key 16A to input an instruction to execute copy processing. When detecting the pressing of the start key 16A, the controller 10 allows the image reading device 11 to read the original document on the platen glass 7 and generate image data on the original document.

The controller 10 allows the sheet feed device 13 to feed forward a sheet P contained in the sheet feed cassette to the sheet conveyance path 30. Furthermore, the controller 10 drives the first drive motor to allow the conveyance rollers 32 to rotate and thus allow the conveyance roller 32 to convey the sheet P along the sheet conveyance path 30.

Figure 7:
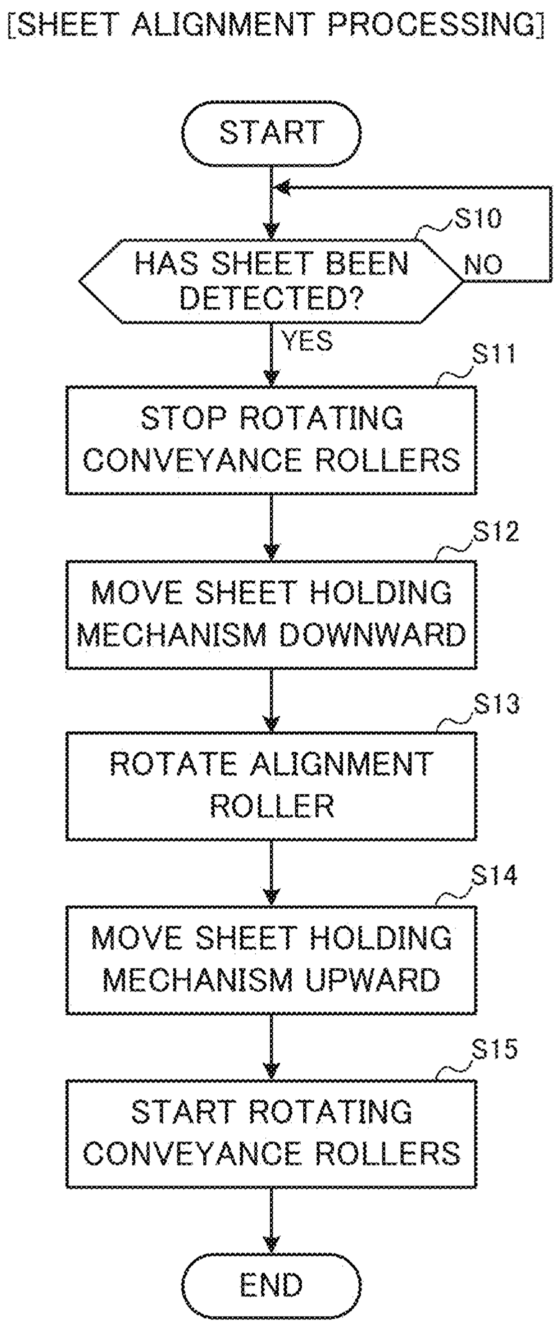
FIG. 7 is a flowchart showing sheet alignment processing.
Figure 8A:
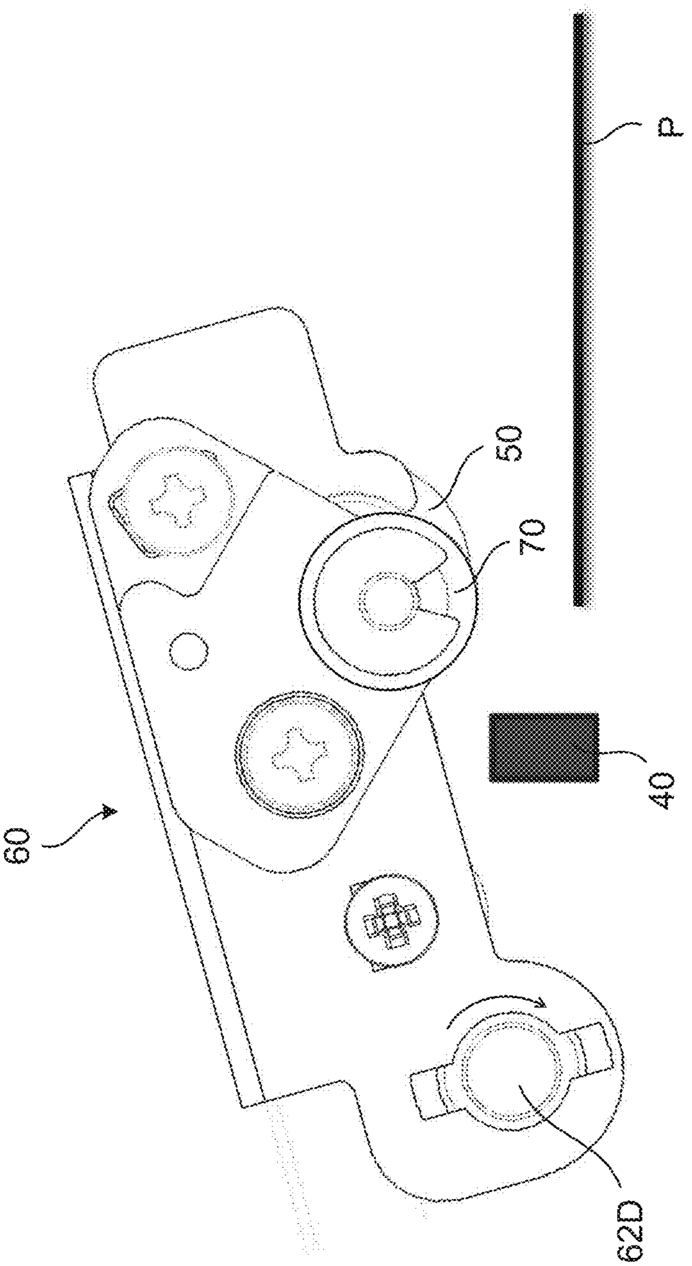
FIG. 8A is a view showing how the sheet holding mechanism takes a backing position.

When the rotation of the conveyance rollers 32 starts, the controller 10 starts the execution of the sheet alignment processing shown in FIG. 7. As shown in FIG. 8A, at the start of the sheet alignment processing, the sheet holding mechanism 60 takes the backing position being a home position. At this time, the alignment roller 50 and the sheet holding roller 70 are located above the sheet conveyance path 30 and out of contact with the sheet P present in the sheet conveyance path 30.

After starting the execution of the sheet alignment processing, the controller 10 repeats processing of determining that no sheet P in the sheet conveyance path 30 is detected, until the sheet detection sensor outputs an OFF signal (NO in step S10). When in this situation the leading end of the sheet P being conveyed by the conveyance rollers 32 reaches the position of the sheet detection sensor, the output signal of the sheet detection sensor changes from an ON signal to an OFF signal.

When detecting the output of an OFF signal from the sheet detection sensor, the controller 10 determines that the sheet P has been detected (YES in step S10) and stops driving the first drive motor to allow the conveyance rollers 32 to stop rotating (step S11).

Figure 8B:
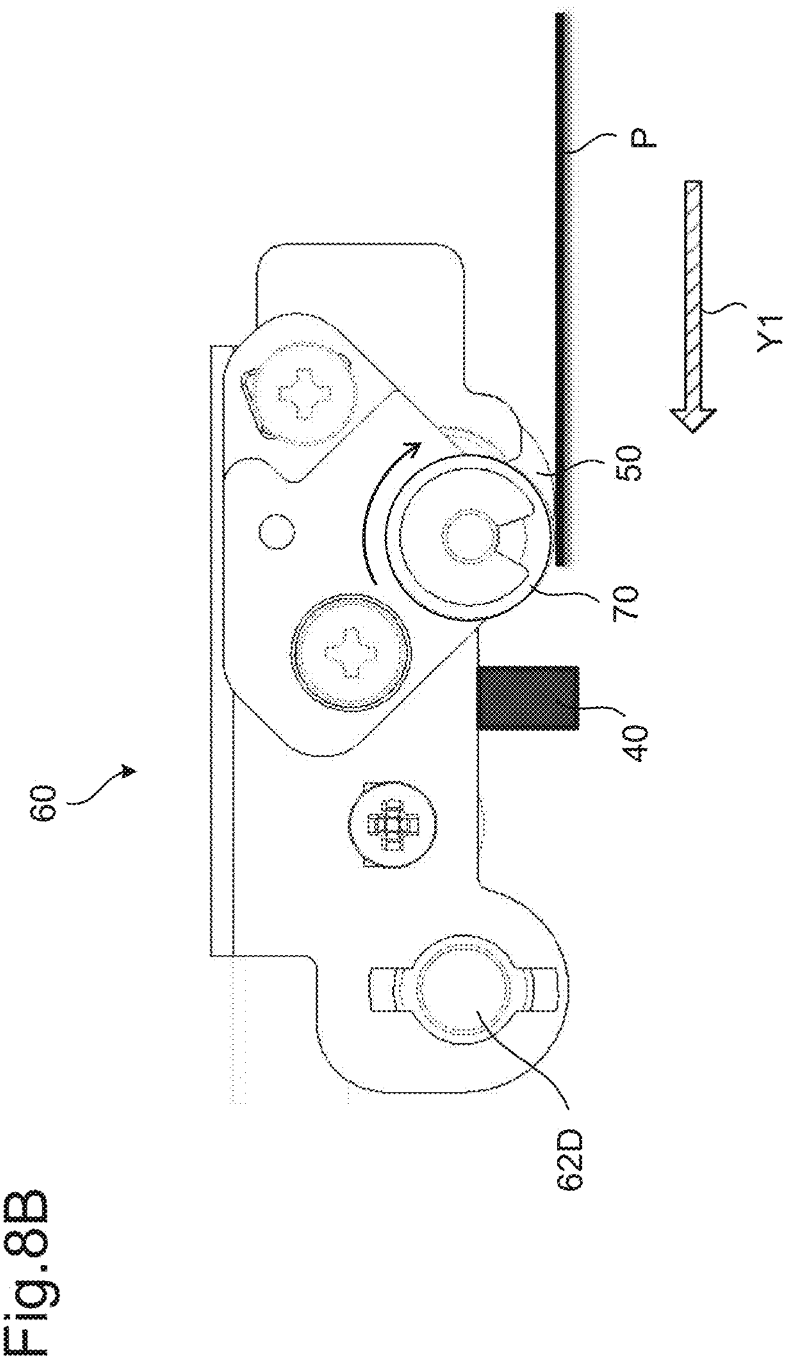
FIG. 8B is a view showing how the sheet holding mechanism takes a hold-down position.
Figure 8C:
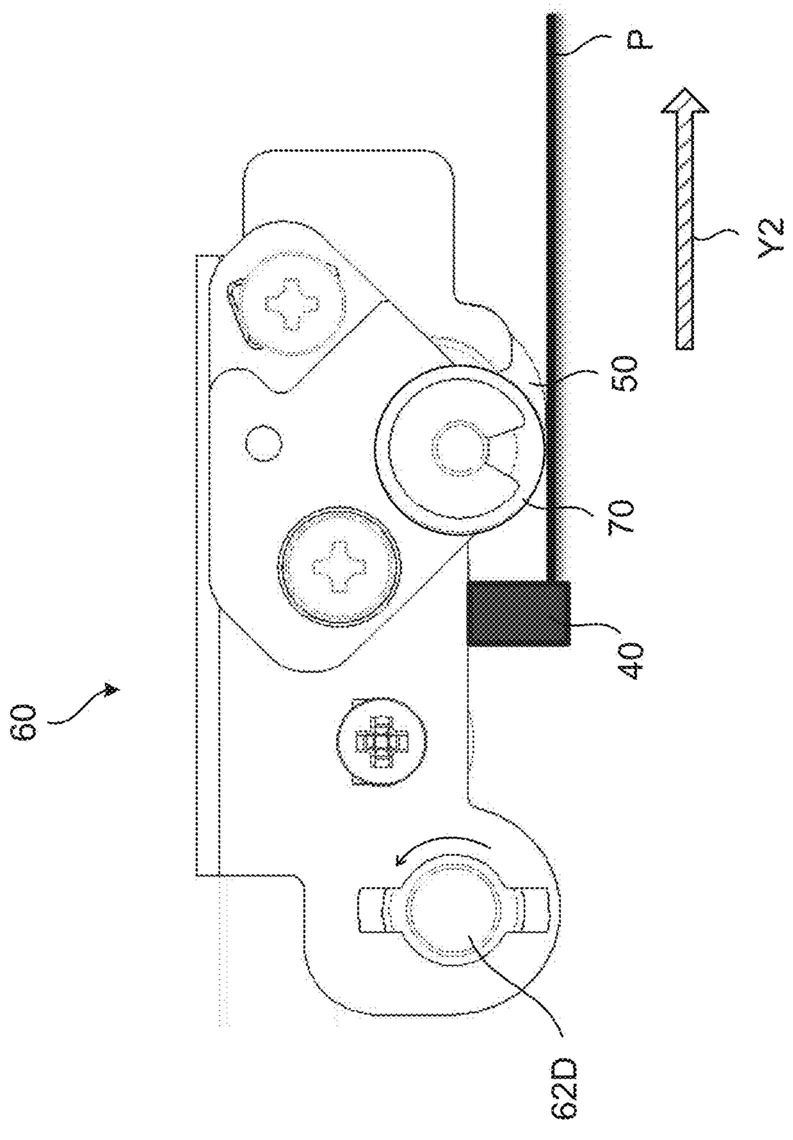
FIG. 8C is a view showing how the sheet is aligned.

After the processing in step S11, the controller 10 drives the third drive motor to allow the rotating shaft 62D to rotate clockwise as viewed in the plane of the figure to pivotally move the sheet holding mechanism 60 downward, thus changing the sheet holding mechanism 60 from the backing position shown in FIG. 8A from the hold-down position shown in FIG. 8B (step S12). Thus, the alignment roller 50 and the sheet holding roller 70 move down and make contact with the sheet P present in the sheet conveyance path 30.

After the processing in step S12, the controller 10 drives the second drive motor to allow the alignment roller 50 to rotate a predetermined number of turns clockwise as viewed in the plane of the figure while making contact with the sheet P (step S13). Thus, the sheet P moves in the sheet alignment direction Y1 and one end of the sheet P in the sheet width direction Y thus abuts on the alignment plate 40 as shown in FIG. 8C. During the time, the sheet holding roller 70 rotates together with the movement of the sheet P in the sheet alignment direction Y1.

Upon abutment of the sheet P against the alignment plate 40, the sheet P is subjected to a force to bounce the sheet P in the sheet bounce direction Y2. However, the sheet holding roller 70 does not rotate in the sheet bounce direction Y2 and keeps the sheet P from moving in this direction. Therefore, the movement of the sheet P in the sheet bounce direction Y2 is prevented by the sheet holding roller 70.

After the processing in step S13, the controller 10 drives the third drive motor to allow the rotating shaft 62D to rotate counterclockwise as viewed in the plane of the figure to pivotally move the sheet holding mechanism 60 upward, thus returning the sheet holding mechanism 60 from the hold-down position shown in FIG. 8B to the backing position shown in FIG. 8A (step S14).

After the processing in step S14, the controller 10 restarts driving the first drive motor to allow the conveyance rollers 32 to start rotating (step S15). After the processing in step S15, the controller 10 ends the sheet alignment processing. The controller 10 allows the image forming device 12 to form an image on the sheet P being conveyed along the sheet conveyance path 30 and allows the ejection roller 33 to eject the sheet P with the image formed thereon to the sheet output tray 8.

In the general technique described previously, as the sheet conveyance speed increases, the load on the motor for slowing down the speed increases. Therefore, an expensive and high-performance motor is necessary.

Unlike this, in the above embodiment, the sheet conveying device 2 can prevent the sheet P from bouncing from the alignment plate 40, without use of any expensive and high-performance motor, with the sheet holding mechanism 60 having a simple and inexpensive structure. As a result, the position of the sheet P in the sheet width direction Y can be accurately aligned and, thus, the skew of the sheet P can be certainly corrected.

In the above embodiment, the sheet holding roller 70 rotates with the movement of the sheet P in the sheet alignment direction Y1, but does not rotate in the sheet bounce direction Y2 and keeps the sheet P from moving in this direction. Thus, the sheet P can be brought into abutment on the alignment plate 40 without imposing any load on the alignment roller 50 and the bounce of the sheet P that might be caused by the abutment on the alignment plate 40 can be certainly prevented.

Furthermore, in the above embodiment, the sheet holding roller 70 is composed of a cylindrical one-way clutch 70A and an elastic body 70B covering the periphery of the one-way clutch 70A. Thus, the bounce of the sheet P can be prevented with a simpler and more inexpensive structure.

In the above embodiment, the sheet holding roller 70 is provided near the alignment roller 50. Therefore, the bounce of the sheet P can be prevented more efficiently.

In the above embodiment, since the image forming apparatus 1 include the sheet conveying device 2, the image forming device 12 can form an image at an accurate position on the sheet P.

Modifications

Although in the above embodiment the sheet conveying device 2 is provided inside the image forming apparatus 1, the present disclosure is not limited to the above embodiment. For example, in order to correct the deviation of the sheet P from the optical axis, the sheet conveying device 2 may be provided inside the document conveyance device 6 of the image reading device 11. Alternatively or additionally, the sheet conveying device 2 may be provided in a post-processing device that subjects the sheet P conveyed from the image forming apparatus 1 to post processing, such as stapling or punching.

Although the description of the above embodiment has been given by taking as an example the image forming apparatus 1 in an ink-jet printing system, the present disclosure is not limited to the above embodiment. The image forming apparatus 1 may be, for example, an electrophotographic image forming apparatus.

The structure, configuration, and processing of the above embodiment described with reference to FIGS. 1 to 8C are merely illustrative of the present disclosure and are not intended to limit the present disclosure to them.

While the present disclosure has been described in detail with reference to the embodiments thereof, it would be apparent to those skilled in the art that the various changes and modifications may be made therein within the scope defined by the appended claims.

What is claimed is:

1. A sheet conveying device comprising:

a sheet conveyance path;

a conveyance roller that conveys a sheet along the sheet conveyance path;

an alignment plate that is provided at one end of the sheet conveyance path in a direction orthogonal to a direction of conveyance of the sheet and in parallel with the direction of conveyance of the sheet and aligns a position of the sheet in the direction orthogonal to the direction of conveyance;

an alignment roller that rotates in the direction orthogonal to the direction of conveyance while making contact with the sheet present in the sheet conveyance path, thus bringing the sheet into abutment on the alignment plate; and a sheet holding mechanism that makes contact from above with the sheet present in the sheet conveyance path to hold the sheet against movement away from the alignment plate, wherein the sheet holding mechanism comprises a sheet holding roller that rotates with movement of the sheet toward the alignment plate, but keeps from rotating in a direction of movement of the sheet away from the alignment plate, wherein the sheet holding mechanism further comprises a frame that includes a pair of side portions opposed to each other and a connecting portion connecting between the pair of side portions and thus has a C-shaped cross section, the alignment roller is provided between the pair of side portions to project partly beyond an opening of the C-shaped cross section of the frame, and the sheet holding roller is mounted to one of the pair of side portions to project partly beyond the one side portion along a direction toward which the opening of the C-shaped cross section of the frame opens.

2. The sheet conveying device according to claim 1, wherein the sheet holding roller comprises a cylindrical one-way clutch and an elastic body covering a periphery of the one-way clutch.

3. The sheet conveying device according to claim 1, wherein the sheet holding roller is provided adjacent to the alignment roller, along the direction orthogonal to the direction of conveyance, the sheet holding roller and the alignment roller being commonly supported by the frame.

4. An image forming apparatus comprising:

the sheet conveying device according to claim 1; and an image forming device that forms an image on the sheet being conveyed by the conveyance roller.

* * * * *